(No Model.)
W. S. POTTER.
PROCESS OF EXTRACTING IMPURITIES FROM HEMATITE ORES.
No. 518,510. Patented Apr. 17, 1894.
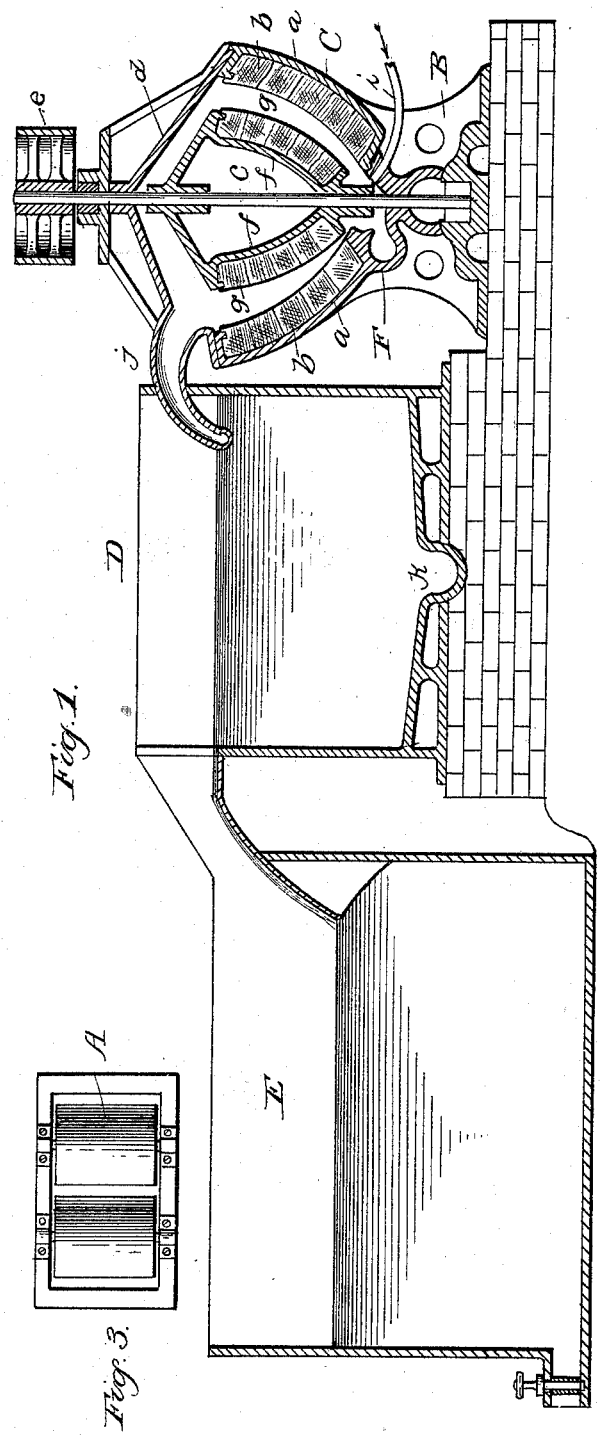
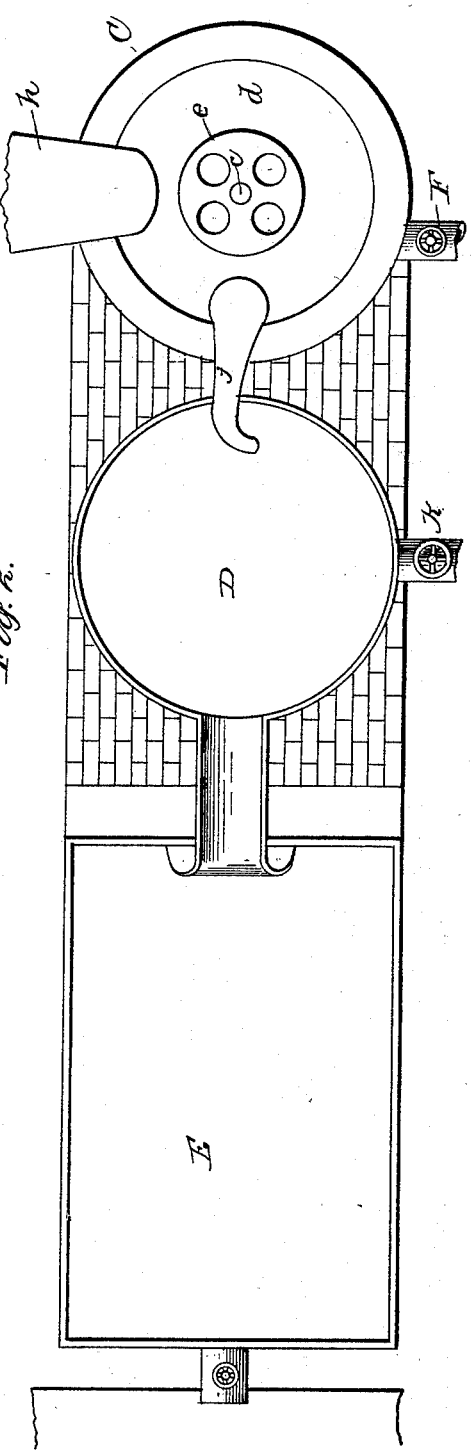
Witnesses.
Victor J. Evans.
J. F. Beale.
Inventor.
Winfield S. Potter
By W. A. Redmond
Attorney.

UNITED STATES PATENT OFFICE.

WINFIELD S. POTTER, OF ST. PAUL, MINNESOTA.

PROCESS OF EXTRACTING IMPURITIES FROM HEMATITE ORES.

SPECIFICATION forming part of Letters Patent No. 518,510, dated April 17, 1894.

Application filed July 29, 1891. Serial No. 401,089. (No specimens.)

*To all whom it may concern:*

Be it known that I, WINFIELD S. POTTER, a citizen of the United States, residing at St. Paul, in the county of Ramsey and State of Minnesota, have invented certain new and useful Improvements in Processes of Extracting Impurities from Hematite Ores; and I do hereby declare the following to be a full, clear, and exact description of the invention, such as will enable others skilled in the art to which it appertains to make and use the same.

This invention relates to methods or processes of extracting silica, lime, alumina, phosphorus and other impurities from hematite ores, and it has for its object to purify such ores and thus render the same more valuable for metallurgical and other purposes, and it consists, first in reducing the ores by crushing into grains without crushing the impurities; second, triturating the mass as reduced between wooden or other yielding surfaces with water until the particles of ferric oxide are reduced to a smooth paste, leaving the particles of silica, &c., uncrushed; third, treating the whole mass to a bath of boiling water and stirring or agitating the same; and fourth, drawing off the water containing the mass into another vessel and permitting the same to stand until the iron oxide settles and then drawing off the water therefrom, as hereinafter more fully described and claimed.

I have discovered that the structure of certain red hematite ores renders the separation of silica and other impurities from the iron oxide a mechanical possibility, this arising from the fact that the silica, lime, alumina, &c., exist as granules of appreciable size, whereas the oxide of iron is a matrix readily reducible, by crushing and trituration, to a smooth grainless paste.

In carrying out my process I take the ore as delivered from the mine and pass it between metallic rollers, or crush or reduce it by any suitable or desired device into grains not smaller than the largest grain of silica, lime, alumina, &c., and, when thus reduced to a coarse sand, I transfer it to a suitable apparatus and triturate it with water between wooden or other yielding surfaces so as not to crush the silica, &c., until the particles of ferric oxide are reduced to a smooth paste, while the particles of silica, lime, &c., remain uncrushed or in their granular form. The whole mass is then transferred to a vessel containing boiling water and is then stirred or agitated by hand or by any suitable machinery, the pasty iron oxide being held for a time in suspension and the grains of silica, &c., sinking or settling in the vessel. The water holding the oxide of iron is then drawn off into a suitable vessel and allowed to stand until the iron oxide settles or gravitates to the bottom, when the water is drawn off from this second vessel. From the first vessel may be removed a material containing a small per centage of iron oxide as waste, and from the second vessel may be removed a material composed largely of oxide of iron and containing aluminum silicate one per cent., silica one per cent., lime two per cent., phosphorus one-half per cent., more or less depending upon the original ore, assumed in this case to be: oxygen eighteen per cent., iron forty per cent., aluminum silicate three per cent., calcium carbonate twenty per cent., manganese phosphorus and sulphur one per cent., silica eighteen per cent.

The essential points to be observed in carrying out my invention in order to obtain the best results are: First, that the ore be crushed so as to leave uncrushed all particles of impurities therein and to reduce the ore to a size not less than the largest grains of the impurities; second, reducing the particles of iron to a finely divided condition between wooden or other yielding surfaces with water and without injury to or crushing of the impurities; and, third, immersion of the whole mass in boiling water and thorough agitation of the same so as to release the pasty oxide of iron from the impurities to which it may adhere.

In the accompanying drawings, in which Figure 1 is a vertical longitudinal section, Fig. 2 a plan view and Fig. 3 a plan view of a pair of rollers, I show a machine adapted to carry out my process and in which similar letters refer to similar parts in all the views.

A represents the rollers of a rock or ore crushing machine through which the ore is passed to be reduced into grains of the desired size and which machine may be of any desired type. The triturating machine, by which the particles of ferric oxide contained in the crushed ore are reduced to a smooth paste, consists, preferably, of a frame work B which supports the mortar C, said mortar comprising a shell $a$ within which is secured in any desired manner the blocks of wood $b$ which form one of the rubbing surfaces and which are, preferably, arranged, as shown, so that wear thereon will be across the grain of the wood. A shaft $c$ is stepped in the framework B and has a bearing in the cover $d$ of the shell and is rotated by a pulley $e$ connected to any convenient power, said shaft carrying a cone composed of the casting $f$ on which is secured the wooden blocks $g$ which blocks are arranged in a similar manner to blocks $b$. The crushed ore is fed to the triturator through a spout $h$ and is rubbed between the cone and shell until the ferric oxide is finely reduced by the action of the blocks and is converted into a semi-liquid paste by the action of the water fed thereto through a pipe $i$ entering the shell from below the rubbing surfaces. The ferric oxide is floated off through a spout $j$ which is preferably bent to one side so as to discharge into a vessel or tank D at a tangent in order to impart a whirling or rotary movement to the body of water contained in said vessel or tank. The water in tank D may be heated to the point of boiling either before or after being placed in the tank, and it may be agitated or stirred by hand in addition to the agitation consequent to the tangential discharge therein from spout $j$, thus assisting in the rapid separation of the iron oxide from the grains of silica, &c., which latter settle at the bottom of the tank and are drawn off through pipe $k$, while the iron oxide is floated over into a tank E containing water and allowed to settle therein, forming a liquid of the consistency of cream, when it is drawn off and permitted to dry. The waste which gravitates to the bottom of shell or mortar C is drawn off through pipe F.

Having thus described my invention, what I claim as new, and desire to secure by Letters Patent, is—

1. The process of extracting impurities from hematite ores, consisting, first in reducing the ores to grains, of the size of coarse sand, triturating the ores in the presence of water to reduce the particles of ferric oxide to a smooth paste, subjecting the whole mass to a hot water bath, stirring or agitating the same therein, drawing off the water, and permitting the same to stand until the iron oxide settles therein and then drawing off the water therefrom, as set forth.

2. The process hereinbefore described of treating hematite ores to separate the oxide of iron from impurities which consists, first in crushing or reducing the ores to a coarse sand, triturating the reduced ores in the presence of water between yielding surfaces to a smooth paste without disintegration of the impurities, immersing the whole mass in boiling water and agitating the same, drawing off the water and allowing the same to stand until the ferric oxide settles therein, and then drawing off the water from the settlings, substantially as set forth.

In testimony whereof I affix my signature in presence of two witnesses.

WINFIELD S. POTTER.

Witnesses:
J. A. GARDNER,
S. L. CAMPBELL.